(12) United States Patent
Iacovangelo et al.

(10) Patent No.: US 6,587,263 B1
(45) Date of Patent: Jul. 1, 2003

(54) OPTICAL SOLAR REFLECTORS

(75) Inventors: Charles Dominic Iacovangelo, Niskayuna, NY (US); Yiqun Pan, Clifton Park, NY (US); Chang Wei, Niskayuna, NY (US); Mao Chen, Evansville, IN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/540,757

(22) Filed: Mar. 31, 2000

(51) Int. Cl.$^7$ ................................................. G02B 5/20
(52) U.S. Cl. ..................... 359/359; 359/350; 359/580; 359/585; 359/838; 359/883; 427/163.4; 427/167; 428/216; 428/336; 428/428; 428/432; 428/472; 428/655; 428/698; 428/701; 523/135
(58) Field of Search ................... 359/359, 360, 359/883, 580, 585, 350, 838; 427/167, 163.4; 523/135; 428/216, 336, 428, 432, 472, 655, 698, 701

(56) References Cited

U.S. PATENT DOCUMENTS

| | | | |
|---|---|---|---|
| 3,174,537 A | 3/1965 | Meyer | |
| 3,671,286 A | 6/1972 | Fischell | |
| 4,189,205 A | 2/1980 | Vandehei | |
| 4,479,027 A | 10/1984 | Todorof | 136/249 |
| 4,479,131 A | 10/1984 | Rogers et al. | 343/872 |
| 4,663,234 A | 5/1987 | Bouton | 428/422 |

(List continued on next page.)

FOREIGN PATENT DOCUMENTS

| | | |
|---|---|---|
| EP | 0568943 | 11/1993 |
| EP | 0918044 | 5/1999 |
| JP | 56128901 | 10/1981 |
| JP | 04238798 | 8/1992 |
| JP | 05039100 | 2/1993 |

OTHER PUBLICATIONS

Martin P M et al.: "Multilayer coatings and optical materials for tuned infrared emittance and thermal control" Proceedings of the 1998 MRS Fall Meeting—Symposium OO—vol. 555, Nov. 30, 1998 pp. 3–12.

A. Factor, W.H. Irving and P.E. Donahue, "The Chemistry of Silicone Hardcoat," General Electric Company Corporate Research and Development Report, MOR–83–051, Jun. 1983.

(List continued on next page.)

*Primary Examiner*—Audrey Chang
*Assistant Examiner*—Craig Curtis
(74) *Attorney, Agent, or Firm*—Swidler Berlin Shereff Friedman LLP

(57) ABSTRACT

An method, and method of production thereof, which provides excellent performance, reduced cost, and reduced breakage due to reduced manual handling. The present invention comprises a substrate, a bond layer coating the substrate, a reflective layer coating the bond layer, and a radiative layer coating the reflective layer. Preferably, the radiative layer comprises $SiO_2$, $Si_3N_4$ or $SiO_xN_y$, low absorbency of electromagnetic radiation having wavelengths of approximately 200 nm to approximately 2500 nm and high absorbency and emissivity electromagnetic radiation having wavelengths of approximately 2.5 $\mu$m to approximately 25 $\mu$m. Preferably, the bond layer comprises chromium, titanium, or titanium-tungsten and the substrate comprises aluminum, aluminum alloys, polyimide, carbon-filled polyimide, or carbon composite. The present invention may further comprise a barrier layer between the reflective layer and the radiative layer, preferably comprising $MgF_2$, which improves adhesion between the reflective layer and the radiative layer during thermal cycling. The present invention may further comprise a surface-leveling layer between the substrate and the bond layer, preferably comprising a silicone hardcoat material, which improves surface smoothness of the substrate. The radiative layer may have a modulated refractive index profile. The parameters of the modulated refractive index profile of the radiative layer may control amplitude, bandwidth and wavelength of rejection bands of the radiative layer.

90 Claims, 10 Drawing Sheets

U.S. PATENT DOCUMENTS

| | | | |
|---|---|---|---|
| 4,850,660 A | | 7/1989 | Jones et al. |
| 5,183,700 A | | 2/1993 | Austin .......................... 428/216 |
| 5,253,105 A | * | 10/1993 | Paul et al. ................... 359/359 |
| 5,258,872 A | | 11/1993 | Johnson et al. ............. 359/589 |
| 5,306,547 A | | 4/1994 | Hood et al. .................. 428/213 |
| 5,372,874 A | | 12/1994 | Dickey et al. ............... 428/216 |
| 5,400,986 A | | 3/1995 | Amore et al. ................ 244/173 |
| 5,541,010 A | | 7/1996 | Tanzilli et al. ............... 428/336 |
| 5,608,414 A | | 3/1997 | Amore |
| 5,680,245 A | | 10/1997 | Lynam ......................... 359/265 |
| 5,835,255 A | | 11/1998 | Miles ........................... 359/291 |
| 5,867,329 A | | 2/1999 | Justus et al. ................. 359/861 |
| 5,912,777 A | * | 6/1999 | Jaworske ..................... 359/883 |
| 5,935,702 A | * | 8/1999 | Macquart et al. ............ 428/336 |
| 5,993,950 A | * | 11/1999 | Novis et al. ................. 359/359 |
| 6,045,896 A | * | 4/2000 | Boire et al. .................. 428/216 |
| 6,142,642 A | * | 11/2000 | Krisko et al. ................ 359/584 |

OTHER PUBLICATIONS

B. T. Anthony, "Advanced Silicone Hardcoats for Lexan Polycarbonate," General Electric Company Corporate Research and Development Report, MOR–85089, Sep. 1985.

W. E. Johnson and R. L. Crane, "Introduction to Rugate Filter Technology," *SPIE*, vol. 2046, pp. 88–124, Apr. 1993.

B. G. Bovard,"Rugate Filter Theory: An Overview," *Applied Optics*, vol. 32, No. 28, pp. 5427–5442, Oct. 1993.

\* cited by examiner

OPTICAL SOLAR REFLECTORS

FIELD OF THE INVENTION

The present invention relates to improved optical solar reflectors, and in particular to improved materials and processes for optical solar reflectors.

BACKGROUND OF THE INVENTION

Optical solar reflectors (OSRs) are used in a variety of applications, including space applications, and are often referred to as heat reflectors or thermal control coatings. The function of optical solar reflectors (OSRs) on spacecraft is to minimize thermal absorption and thermal variations in sensitive electronic devices caused by the devices themselves and by solar radiation. Keeping the electronics cool is critical to performance where the power that can be dissipated is dependent on the junction temperature of the active devices. Hence for every degree that the electronic devices can be cooled by emitting heat from the surface or every degree that they are not heated from the sun, the electronic devices can put out several more watts and still remain under the critical junction temperature.

For space applications, OSRs must not absorb in the solar spectrum, typically 200 to 2500 nm, but must absorb and emit from 2.5 to 25 microns, which corresponds to the wavelength of heat radiation generated from electronic equipment the OSRs encompass. This leads to the requirement that must be met by the materials from which an OSR is constructed that the material must have a low ratio of absorption to emissivity. This ratio is defined as $\alpha E$, where $\alpha$ is the absorption coefficient, and E is the emissivity of the material. Additionally, the material from which an OSR is constructed remains stable even in the radiation conditions found in space. This greatly limits the number of materials that can be used.

Prior art OSRs have been constructed by coating a material such as glass, which is known to have low solar absorbency, with a highly reflective material such as Ag or Al so that the solar energy passes through the glass and reflects off the Ag. These silver-coated thin glass sheets are then manually glued to either carbon composite or aluminum alloy substrates. One disadvantage of this construction technique is the relatively high cost of the OSR, due to the extensive labor involved and the high breakage of parts in manual handling.

Another reason that glass has been used in prior art OSRs is because it has characteristic absorbency in the IR region to emit the heat generated from the substrate. The prior art OSR is such a structure which is typically a 3"×3"×0.002" piece of float glass onto which is deposited a silver layer for reflectance and a chromium layer for adhesion. The size and thickness of the prior art OSR is limited by the strength of the float glass. This thickness is a significant weight penalty for the spacecraft. Attempts to make thinner OSRs using prior art construction have been unsuccessful because they become very brittle so that they cannot be handled and the emissivity drops off causing poor performance. Even at the current thickness, they are very brittle and a large percentage are broken in handling and trying to cement them to the space craft substrate (tile). The current area of 3"×3" is also a major limitation since the average spacecraft will require a very large number of such pieces. In addition, the absorbency of the float glass in the solar region is high due to the additives used to provide ductility to the glass. For example, $CeO_2$, $TiO_2$, and ZnO may be added, but these materials absorb energy in the UV spectrum. In addition, the absorbency of the float glass increases in space due to chemical changes from radiation.

Past efforts to improve OSRs have involved attempts to make thin free standing pure $SiO_2$ to overcome these limitations; but this material was too brittle to be handled in the thickness involved. Attempts have also been reported to deposit pure $SiO_2$ onto substrates such as aluminum by CVD processes, but the high temperatures used in those processes resulted in large thermal expansion mismatches, which caused delamination. An alternative approach of anodizing aluminum to alumina was tried, however the trace impurities in the substrate caused color centers to develop in space.

Thus, a need arises for optical solar reflectors that are constructed out of new materials and manufactured using different processes, in order to improve performance and reduce cost.

Two additional problems also arise. First, optical solar reflectors (OSRs) undergo severe thermal cycle requirements. These thermal cycles put enormous strain on the interfaces between layers of the OSR, which is generally due to differences in the coefficients of thermal expansion (CTE) of the various layers. This CTE mismatch, as well as poor chemical bonding between layers, or changes in chemical bonding during cycling, leads to failure of the OSR due to delamination of one or more layers. A need arises for an OSR having improved thermal cycle performance.

Secondly, the $\alpha/E$ performance of an OSR is adversely affected by surface roughness of the reflector. A need arises for a technique by which surface roughness can be improved.

SUMMARY OF THE INVENTION

The present invention is an optical solar reflector, and method of production thereof, which provides excellent performance, reduced cost, and reduced breakage due to reduced manual handling. The optical solar reflector of the present invention comprises a substrate, a bond layer coating the substrate, a reflective layer coating the bond layer, and a radiative layer coating the reflective layer.

Preferably, the radiative layer comprises $SiO_2$, $Si_3N_4$, or $SiO_xN_y$, has low absorbency of electromagnetic radiation having wavelengths in the range of approximately 200 nm to approximately 2500 nm, high absorbency and emissivity of electromagnetic radiation having wavelengths in the range of approximately 2.5 $\mu$m to approximately 25 $\mu$m, and more specifically at approximately 8.6 $\mu$m, a thickness of approximately 10–25 $\mu$m, and more specifically approximately 16 $\mu$m, and is deposited by a plasma enhanced chemical vapor deposition process.

Preferably, the reflective layer comprises aluminum or silver and has a thickness of approximately 50–1000 nm, and more specifically approximately 300 nm.

Preferably, the bond layer comprises chromium, titanium, or titanium-tungsten and has a thickness of approximately 10 nm, and more specifically approximately 20 nm.

Preferably, the substrate comprises aluminum, aluminum alloys, polyimide, carbon-filled polyimide, and carbon composites.

The optical solar reflector of the present invention may further comprise a barrier layer between the reflective layer and the radiative layer. Preferably, the barrier layer comprises $MgF_2$, has a thickness in the range of approximately 14 nm to 40 nm, and improves adhesion between the reflective layer and the radiative layer during thermal cycling.

The optical solar reflector of the present invention may further comprise a surface-leveling layer between the substrate and the bond layer. Preferably, the surface-leveling layer comprises a silicone hardcoat material, has a thickness of approximately 5 $\mu$m, and improves surface smoothness of the substrate.

The radiative layer may have a modulated refractive index profile. The modulated refractive index profile of the radiative layer may have a plurality of parameters, including peak-to-peak refractive index excursion, period of modulation in optical thickness, and number of modulation cycles. The parameters of the modulated refractive index profile of the radiative layer may control amplitude, bandwidth, and wavelength of rejection bands of the radiative layer.

DETAILED DESCRIPTION OF THE INVENTION

Figure 1:
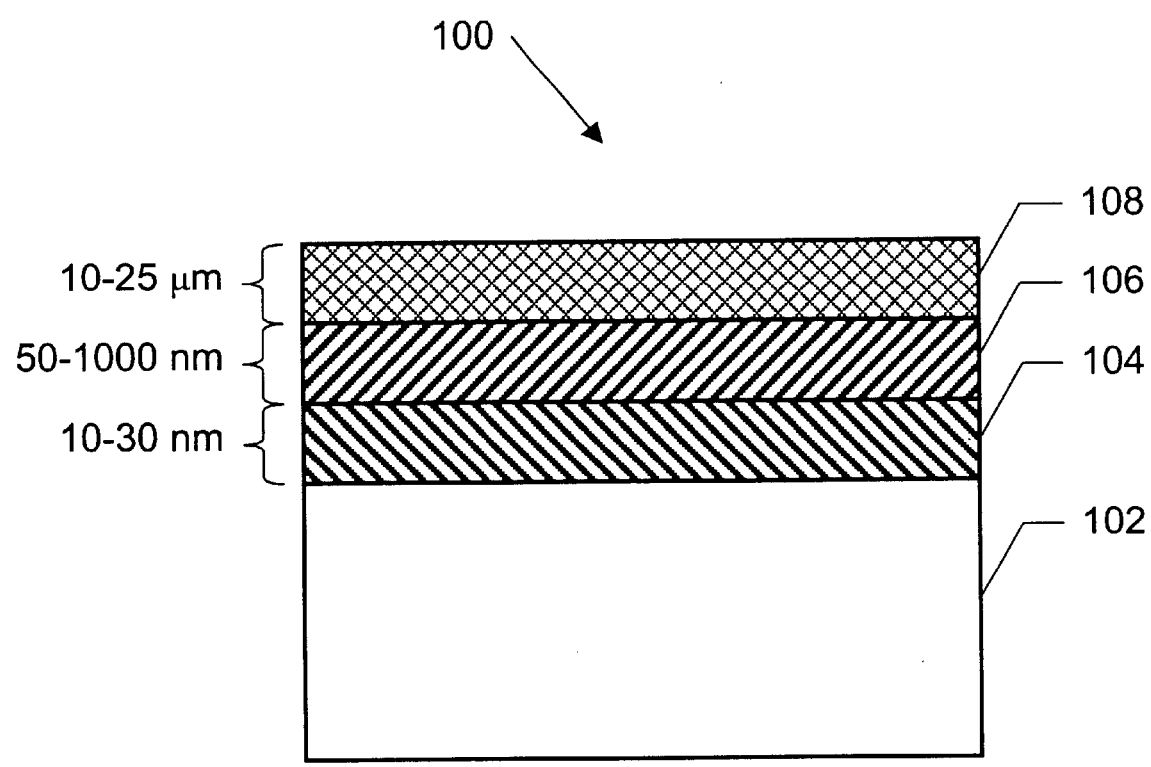
FIG. 1 is an exemplary schematic diagram of an optical solar reflector, according to one embodiment of the present invention.

One embodiment of an optical solar reflector (OSR) 100, according to the present invention, is shown in FIG. 1. OSR 100 comprises a substrate 102, a bond layer 104, a reflective layer 106, and a radiative layer 108. Substrate 102 is a heat generating or heat transmissive layer that encloses or is in thermal contact with active electronic devices or free-standing films. Substrate 102 is may be made from a number of materials, such as aluminum, aluminum alloys, such as 6061 aluminum, polyimide, carbon-filled polyimide, or carbon composites. Bond layer 104 provides a bond between substrate 102 and reflective layer 106. Bond layer 104 is typically made a metal or metal alloy, such as chromium, titanium, or titanium-tungsten, and is typically approximately 10–30 nanometers (nm) in thickness. Reflective layer 106 is typically made of silver (Ag) or aluminum (Al) and is typically approximately 50–1000 nm in thickness.

Radiative layer 108 is deposited directly onto the reflective layer 106. The material used for radiative layer 108 is chosen to have low absorbency of electromagnetic radiation having wavelengths in the 200 nm to 2500 nm range. The wavelength range of 200 nm to 2500 nm is the range that corresponds to the spectrum of energy emitted by the sun. This range includes a portion of the ultraviolet spectrum, from 200 nm to 400 nm, the visible spectrum, from 400 nm to 750 nm, and the near infrared spectrum, from 750 nm to 2500 nm. Low absorbency in this range avoids heating the spacecraft due to absorption of this solar energy. The material chosen for radiative layer 108 must also have high absorbency and emissivity in the infrared wavelength range, from 2.5 $\mu$m (2500 nm) to 25 $\mu$m (25000 nm). This wavelength range corresponds to the spectrum of heat radiation generated by the electronic devices encompassed by the OSR.

Figure 2:
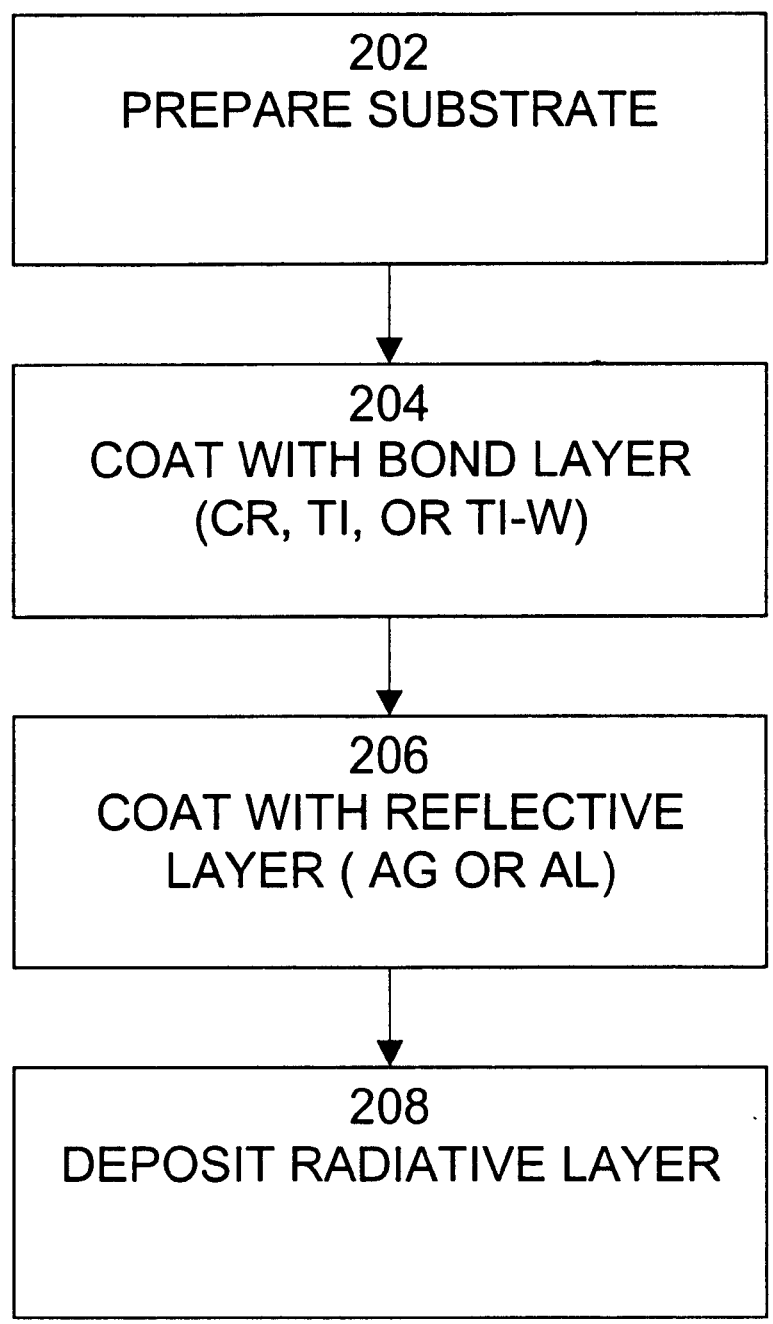
FIG. 2 is an exemplary flow diagram of a process of producing the optical solar reflector shown in FIG. 1.

The OSR shown in FIG. 1 is produced by a process shown in FIG. 2. In step 202, the substrate is prepared for coating by the bond layer. In step, 204, the substrate is coated with a bond layer such as chromium, titanium, or titanium-tungsten, which is typically approximately 10–30 nm in thickness. In step 206, the bond layer is coated with a reflective layer such as Ag or Al, which is typically approximately 50–1000 nm in thickness. The bond layer and the reflective layer are typically deposited by sputtering or evaporation. In step 208, a plasma enhanced chemical vapor deposition process is used to deposit a radiative layer onto the reflective layer at a thickness chosen to minimize weight and optimize emittance in the wavelength range from 2.5 to 25 $\mu$m. Typically the radiative layer is approximately 10–25 $\mu$m thick. This process provides several significant advantages, such as reduced weight, improved performance, improved manufacturability, and reduced scrap due to breakage in handling.

In the present invention, optically reflective layers of coating material are deposited on a substrate using the well-known Plasma Enhanced Chemical Vapor Deposition (PECVD) process, in order to form optical solar reflectors. The well-known Chemical Vapor Deposition (CVD) process creates thin films of material on a substrate via the use of chemical reactions. Reactive gases are fed into a vacuum chamber and these gases react on a substrate and form a thin film or a powder. PECVD improves on CVD by using an electrical discharge to generate a plasma in the which causes the reactive gases to decompose. This causes films to deposit at lower temperatures than CVD.

The direct deposition of the PECVD process overcomes the breakage in handling problem and the added steps of cementing the OSR to the tile surface. The low temperature employed in the PECVD process, typically 25–95° C., and preferably approximately 55° C., minimizes the thermal expansion mismatch problem.

Several materials and thicknesses of materials are suitable for use in the radiative layer of the OSR, as is shown by the performance of a series of sample OSRs, which were fabricated by plasma enhanced chemical vapor deposition (PECVD) of $SiO_2$, $Si_3N_4$, and $SiO_xN_y$ onto Ag coated substrates. The $SiO_2$ coatings were prepared using 2% silane in argon or helium as the precursor for silicon and nitrous oxide as the oxidant. The plasma was generated with a 13.56 MHz RF generator at typically approximately 25–400 watts, and preferably at approximately 100 watts. The pressure was typically approximately 50–300 Pa, and preferably approximately 160 Pa. The silane flow was typically approximately 200–800 sccm, preferably approximately 400 sccm and the nitrous oxide flow was and typically approximately 20–100 sccm, preferably approximately 30 sccm. The $Si_3N_4$ was prepared in an analogous fashion except the oxidant was ammonia, instead of nitrous oxide with a typical flow rate of approximately 10–80 sccm, preferably approximately 30 sccm.

$SiO_xN_y$ was prepared using both nitrous oxide and ammonia in a ratio to give the desired composition. The silver layer was typically approximately 300 nm thick deposited by DC magnetron sputtering over a thin 20 nm Cr, Ti, or Ti-W bond layer. These coatings were deposited in an Argon plasma at 1 Pa and 50 watts, for the silver layer and 100 watts for the bond layer. Shown in Table A are the alpha ($\alpha$) and emissivity (E) values for a series of PECVD coatings. The $\alpha$ values were determined by measuring the reflection from 200 to 2500 nm and normalizing to the solar spectrum in space. The emissivity values were determined from 2.5 $\mu$m to 25 $\mu$m and normalized to black body radiation at 60° C. [E(LM)]. Included in Table A are typical values for a standard prior art OSR which is a 50 $\mu$m thick piece of float glass with silver and chromium deposited on one side.

As shown in Table A, $SiO_xN_y$ gave very good a and emissivity values. In fact, $SiO_4N_6$ gave emissivity values comparable to the prior art OSR, even though the prior art OSR had a much thicker coating. This improvement is due to the enhanced absorption of the mixed oxynitride over the oxide or nitride.

TABLE A

Alpha and emissivity values of PECVD coating on Ag

| Coating | Thick ($\mu$m) | $\alpha$ | E | $\alpha$/E |
|---|---|---|---|---|
| $SiO_2$ | 12.8 | 0.184 | 0.811 | 0.226 |
| $SiO_{1.14}N_{0.57}$ | 16.7 | 0.073 | 0.854 | 0.085 |
| $SiO_{0.8}N_{0.8}$ | 16.8 | 0.070 | 0.857 | 0.082 |
| $SiO_{0.5}N$ | 16.5 | 0.068 | — | — |
| $SiO_3N_4$ | 13.6 | 0.083 | 0.847 | 0.098 |
| standard | 50 | 0.075 | 0.846 | 0.088 |

In this embodiment of the present invention, silicon dioxide or silicon oxynitride is directly deposited on silver substrates using PECVD processes. However, an unexpected absorption at approximately 380 nanometers (nm) was observed, which significantly affects coating optical performance. Thus, to further improve the coatings' $\alpha$/E performance, the 380-mm-absorption peak must be eliminated or minimized. In addition, it is desirable to minimize interface absorption and to provide good mechanical properties, such as low stress, of OSR coatings, in order to have long service life. The present invention minimizes undesired OSR interface/substrate absorption and reduces OSR coatings stress by using modulated $SiO_2/SiO_xN_y/Si_3N_4$ layers.

Figure 3:
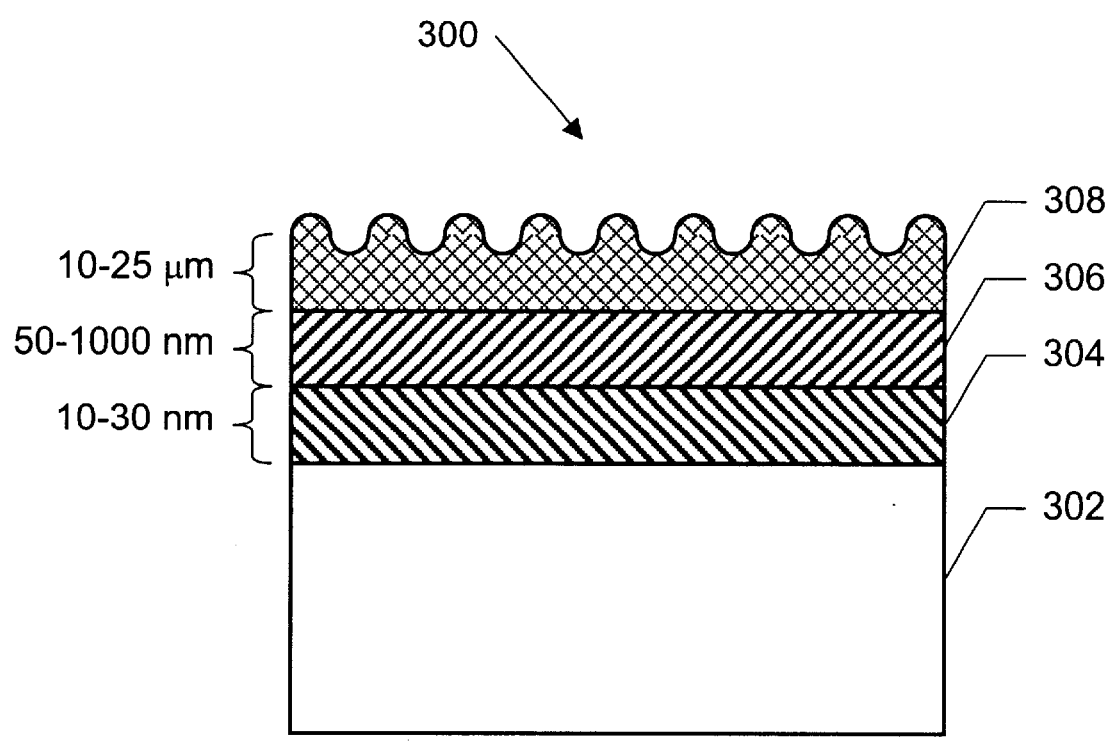
FIG. 3 is an exemplary schematic diagram of an optical solar reflector, according to one embodiment of the present invention.

One embodiment of an optical solar reflector (OSR) 300, according to the present invention, is shown in FIG. 3. OSR 300 comprises a substrate 302, a bond layer 304, a reflective layer 306, and a radiative layer 308. Substrate 302 is may be made from a number of materials, such as aluminum, aluminum alloys, such as 6061 aluminum, polyimide, carbon-filled polyimide, or carbon composites. Bond layer 304 provides a bond between substrate 302 and reflective layer 306. Bond layer 304 is typically made a metal or metal alloy, such as chromium, titanium, or titanium-tungsten, and is typically approximately 10–30 nanometers (nm) in thickness. Reflective layer 306 is typically made of silver (Ag) or aluminum (Al) and is typically approximately 50–1000 nm in thickness.

Radiative layer 308 includes one or more layers of modulated $SiO_2/SiO_xN_y/Si_3N_4$ coatings. Layer 308 may be deposited using PECVD processes that have been modified so that flows of nitrous oxide and ammonia are modulated to produce a coating with spatially varying refractive index. Thus, instead of the formation of a conventional single silicon oxynitride layer at the substrate, a novel modulated $SiO_2/SiO_xN_y/Si_3N_4$ structure is deposited.

Because of the modulated refractive index profile present in the $SiO_2/SiO_xN_y/Si_3N_4$ system, such a coating can reflect light of certain wavelength based on optical principles. By controlling parameters of the layer, such as peak-to-peak refractive index excursion, period of the modulation in optical thickness, and number of modulation cycles, rejection bands with desired amplitude, bandwidth, and wavelength location can be achieved with such coatings.

In the present invention, modulated coatings are applied to OSR substrates to reflect light in a wavelength range that is associated with interface absorption, which is typically at 380 nm, so that the corresponding incident light from solar radiation would not reach the interface. Thus, the increase in $\alpha$ caused by the interface absorption can be minimized or eliminated. The present invention may also be extended to block solar radiation that could be potentially absorbed by substrates or OSR materials. On the other hand, the modulated coating itself is also an emitter and should exhibit similar emittance to that of single $SiO_xN_y$ layer since these materials are essentially the same. Finally, the modulated coatings can also reduce coatings stress. This is because an $SiO_2$ layer, which is often under compressive stress with the current process conditions, can compensate tensile stress induced by $Si_3N_4$ coatings in the modulated structure.

To demonstrate this concept, modulated $SiO_2/SiO_xN_y/Si_3N_4$ coatings were deposited on silver coated glass substrate using PECVD processes with modulated flows of nitrous oxide and ammonia. Multiple rejection bands were designed to minimize the interface absorption around 380 nm, and the coating thickness was comparable to those previously fabricated for single $SiO_xN_y$-based OSR coating, approximately 17 microns ($\mu$m). The $\alpha$ value of the resulting coatings were then determined from the corresponding reflectance spectra and compared to those of the control samples with single $SiO_xN_y$ layer.

Figure 4:
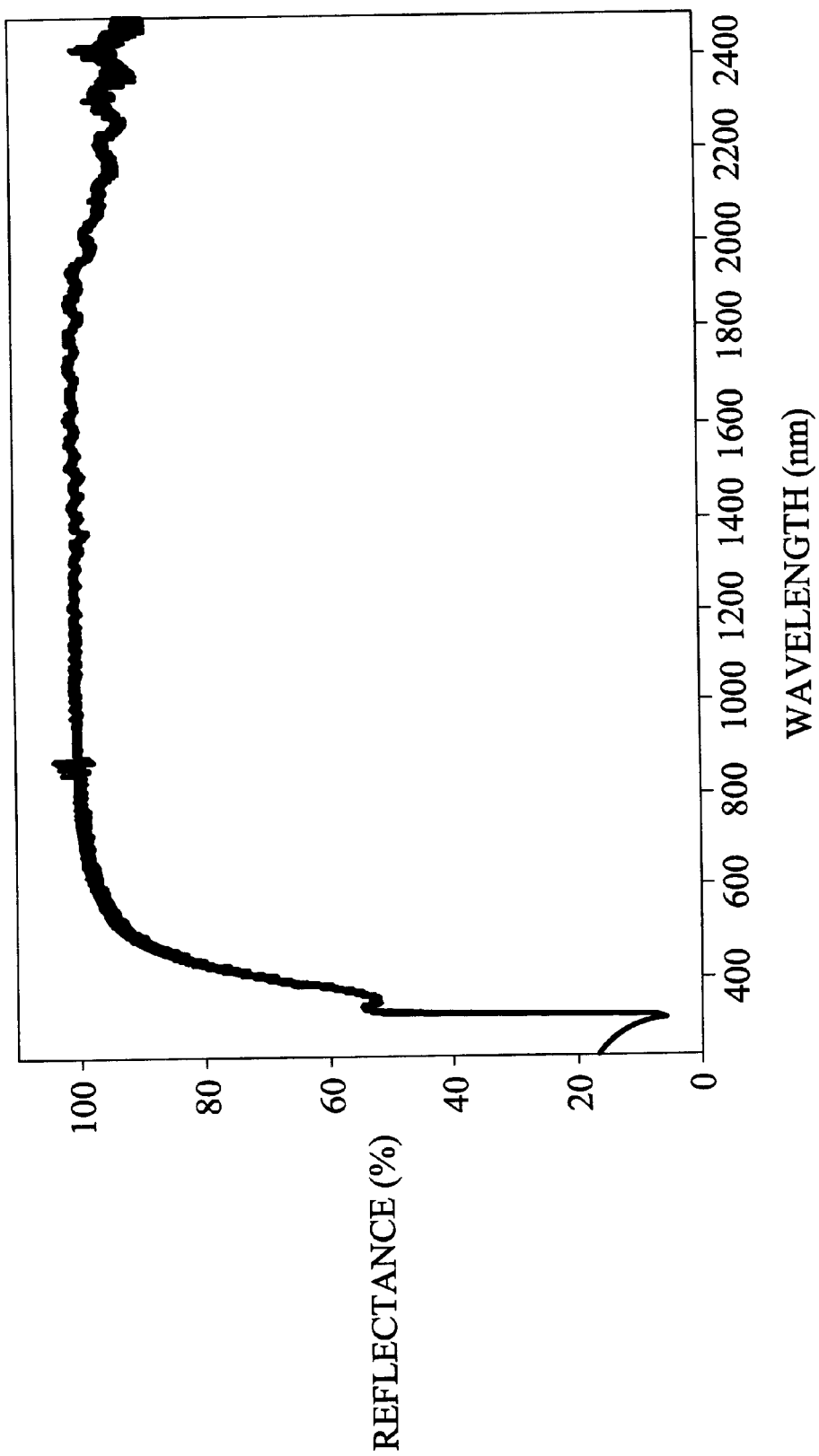
FIG. 4 is an exemplary reflectance spectrum of a typical optical solar reflector, according to the embodiment of the present invention shown in FIG. 1.
Figure 5:
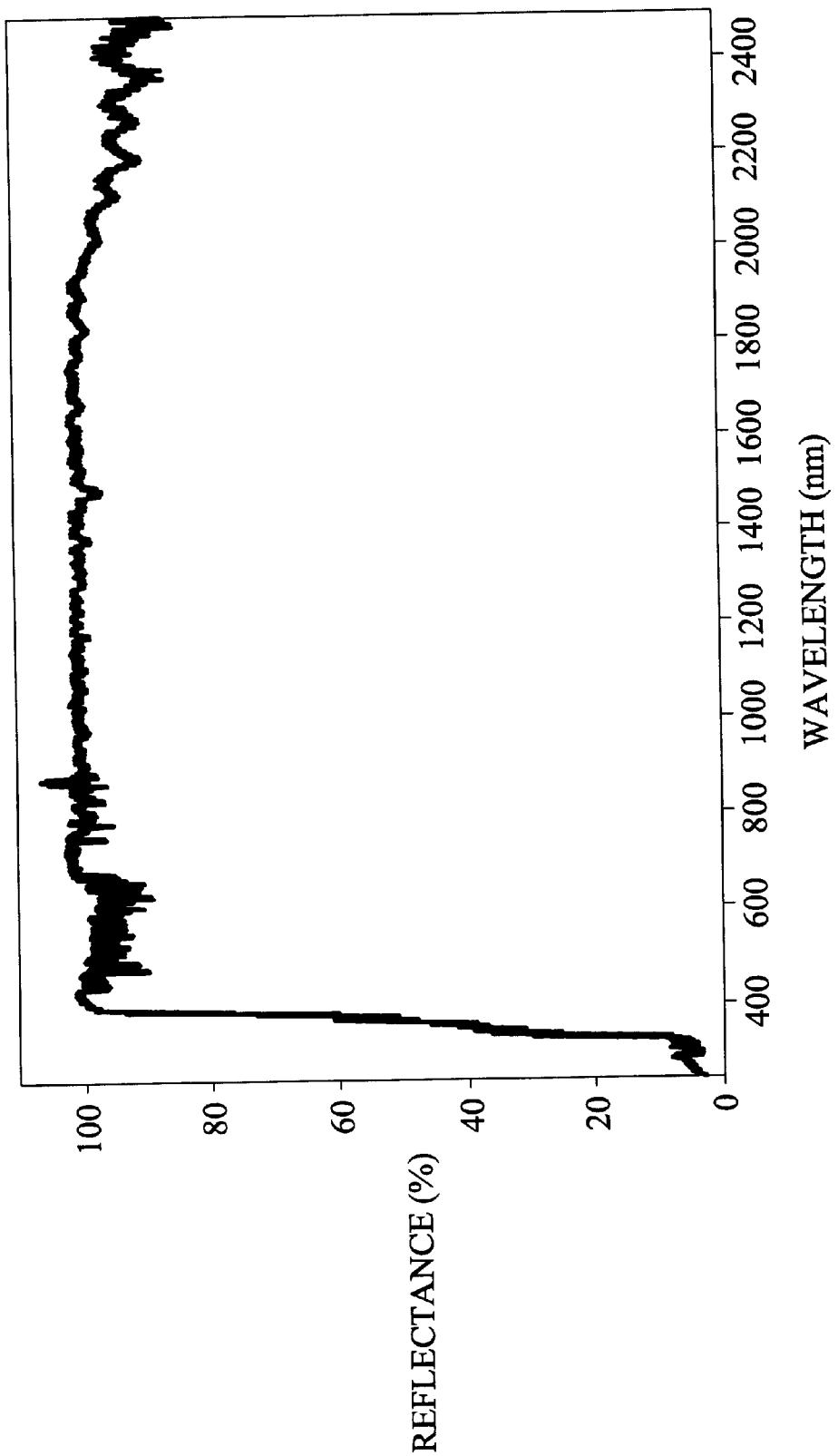
FIG. 5 is an exemplary reflectance spectrum of a typical optical solar reflector, according to the embodiment of the present invention shown in FIG. 3.

The sample with modulated coating appears to have lower interface absorption, which can in turn lead to better $\alpha$ performance. This is shown by comparison of a typical reflectance spectrum for a PECVD-deposited silicon oxynitride coating of 16.8 $\mu$m thickness, shown in FIG. 4, with a reflectance spectrum of a sample modulated $SiO_2/SiO_xN_y/Si_3N_4$ of 16.8 $\mu$m thickness, shown in FIG. 5. As seen, the absorption at 380 nm has almost disappeared because of the multiple rejection bands caused by the modulated coatings. In fact compared to that of the single layer sample, shown in FIG. 4, the sample shown in FIG. 5 shows 25% decrease in $\alpha$ with the use of the modulated coatings. On the other hand, emittance measurement gave comparable values for both modulated $SiO_2/SiO_xN_y/Si_3N_4$ coatings and single $SiO_xN_y$ layers, of approximately 0.85. Thus, improved OSR $\alpha$/E performance can be achieved with the use of such modulated coatings. In addition, the resulting coatings also demonstrated reduced stress with adequate interface adhesion.

Figure 6:
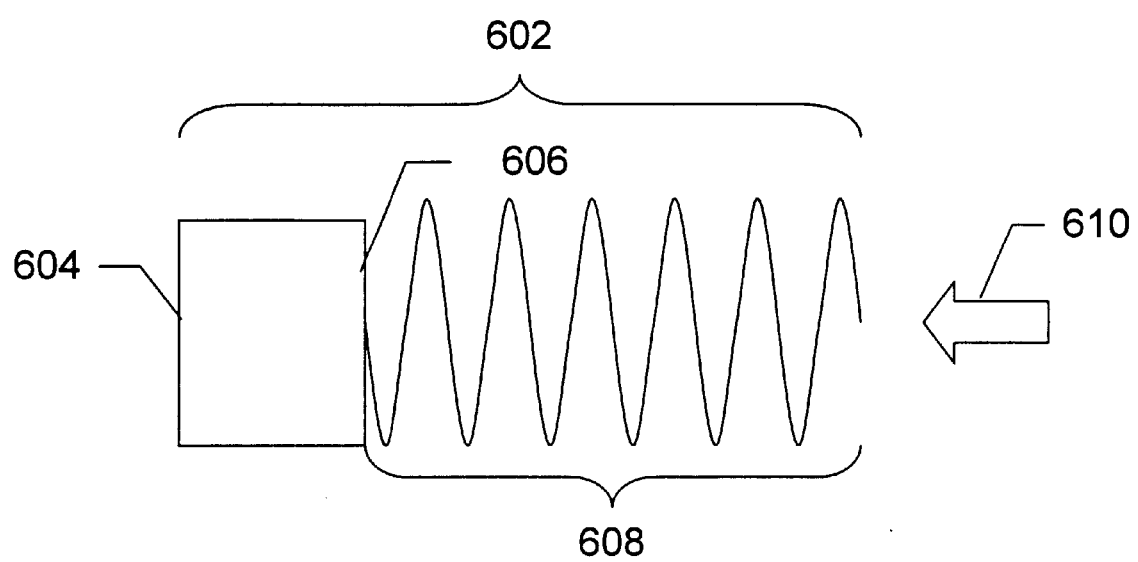
FIG. 6 is an exemplary schematic diagram of refractive index versus optical thickness for an exemplary optical solar reflector, according to the embodiment of the present invention shown in FIG. 3
Figure 7:
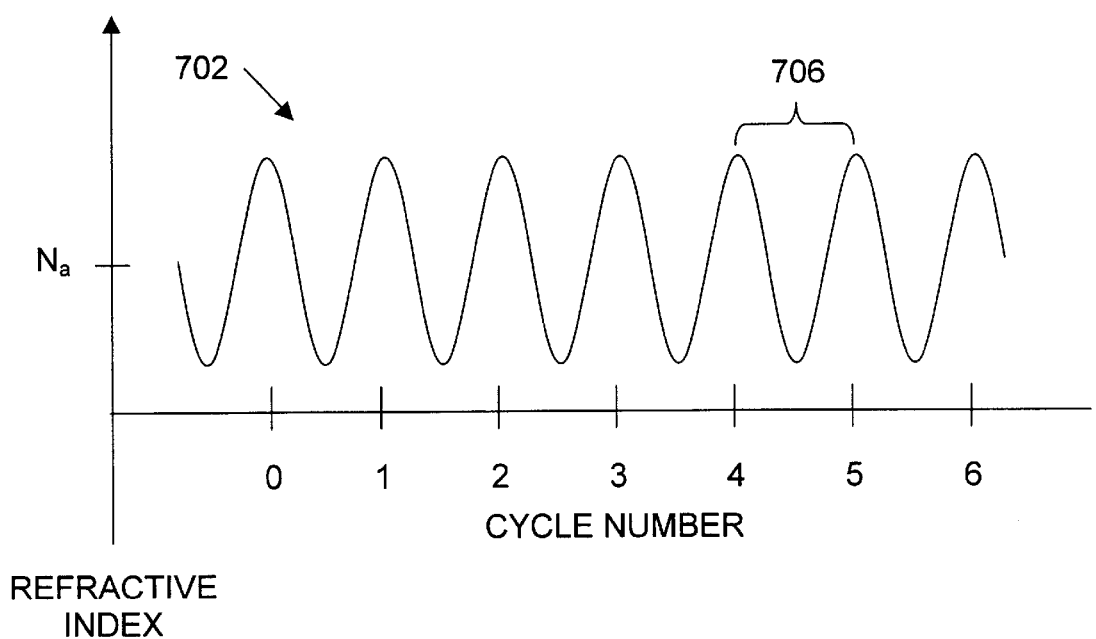
FIG. 7 is a graph of refractive index versus cycle number in an optical film in an exemplary optical solar reflector, according to the embodiment of the present invention shown in FIG. 3

Referring now to the drawings, FIG. 6 shows a schematic of refractive index versus optical thickness for an exemplary optical structure having a modulated coating, such as that shown in FIG. 3. FIG. 7 is a graph of refractive index versus cycle number in a modulated optical film such as that exemplified by FIG. 6. In FIG. 6, the structure 602 may be considered as comprising reflective layer 604, typically made of silver, aluminum, or other reflective material. On one surface 606 of reflective layer 604 is deposited radiative layer 608 of suitable optical material such as $SiO_2/SiO_xN_y/Si_3N_4$. The thickness of layer 608 is dependent on the desired reflective characteristics of layer 608 considering the wavelengths to be rejected, the average refractive index of the layer 608 material and the refractive index profile imposed on the layer. Signal 610 travels to be received by structure 602, reflected by layer 604 and filtered by layer 608.

In accordance with the present invention, a radiative layer 608, deposited on appropriate reflective layer 604, has a sinusoidal refractive index profile 702 of general form shown in FIG. 7.

Layer 608 may be deposited by any of the known techniques for thin film deposition appropriate to the film materials mentioned above, as would occur to one with ordinary skill in the field, such as chemical vapor deposition, physical vapor deposition, molecular beam epitaxy, spin coating or Langmuir-Blodgett, but preferably is deposited using plasma enhanced chemical vapor deposition (PECVD).

A sinusoidal refractive index profile having numerous identical cycles 706 produces one highly reflective band having no associated higher order reflection bands and can be spectrally positioned anywhere in the filter passband. The reflection band resides at wavelength $\lambda=2n_aP$, i.e., twice the optical thickness of one cycle 706.

Figure 8:
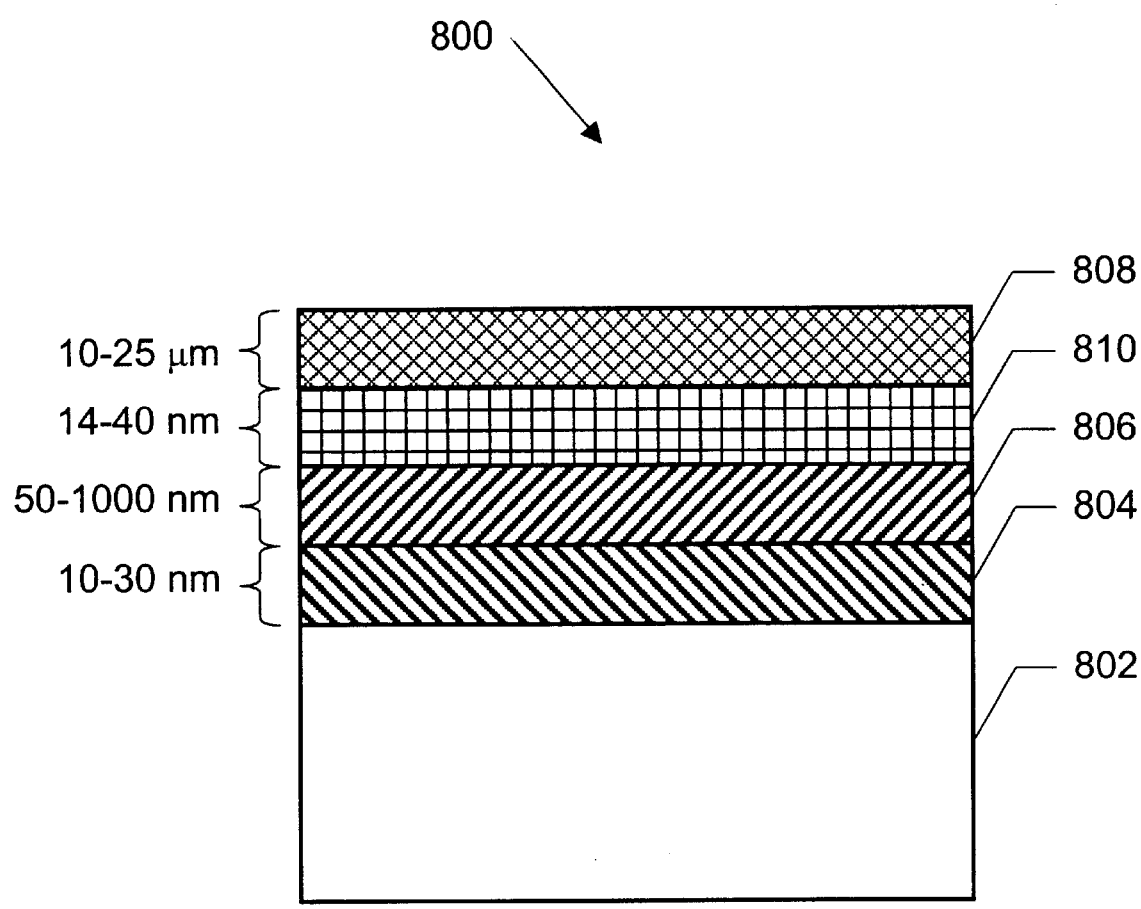
FIG. 8 is an exemplary schematic diagram of an optical solar reflector, according to one embodiment of the present invention.

An embodiment of an optical solar reflector (OSR) 800, according to the present invention, is shown in FIG. 8. OSR 800 comprises a substrate 802, a bond layer 804, a reflective layer 806, a radiative layer 808, and a barrier layer 810. Substrate 802 is a heat generating or heat transmissive layer that encloses or is in thermal contact with active electronic devices. Substrate 802 is may be made from a number of materials, such as aluminum, aluminum alloys, such as 6061 aluminum, polyimide, carbon-filled polyimide, or carbon composites. Bond layer 804 provides a bond between substrate 802 and reflective layer 806. Bond layer 804 is typically made a metal or metal alloy, such as chromium, titanium, or titanium-tungsten, and is typically approximately 10–30 nanometers (nm) in thickness. Reflective layer 806 is typically made of silver (Ag) or aluminum (Al) and is typically approximately 50–1000 nm in thickness. Radiative layer 808 is typically made from silicon oxide, such as $SiO_2$, silicon nitride, such as $Si_3N_4$, or silicon oxynitride, such as $SiO_xN_y$. Radiative layer 808 may be an individual layer, as shown in FIG. 1, or a modulated layer, as shown in FIG. 3.

Barrier layer 810 is typically made from $MgF_2$, which is typically 14 nm to 40 nm in thickness. Barrier layer 810 improves the adhesion between reflective layer 806 and radiative layer 808 during thermal cycling.

A series of coatings were deposited on to 1"×1"×0.02" aluminum alloy 6061 sheets. The coatings were then thermal cycled from −60 to 108° C. in air. Table B lists the results of thermal cycling these coatings. In all examples, the Al 6061 was cleaned in IPA, then sputter etched at 50 W, 3 Pa Ar, for 5 minutes prior to coating with Cr and Ag. The Cr was sputtered at 100 W in Ar at 2 Pa for 6 minutes, which gave a 30 nm coating. The Ag was then sputtered onto the Cr in Ar at 50 W, 1 Pa, for typically 20 minutes giving a coating typically 300 nm thick. The MgF2 coating was sputtered at 100 W in Ar at 3 Pa for various times. The typical MgF2 sputter rate was 2 nm/min. The $SiO_xN_y$ coating was applied by plasma enhanced chemical vapor deposition (PECVD) at 160 Pa under the conditions listed in Table B. Various PECVD conditions were chosen representing different intrinsic stress states in the $SiO_xN_y$ to verify the validity of the invention to different $SiO_xN_y$ coatings.

TABLE B

OSR Performance During Thermal Cycling

| | SiOxNy deposition conditions | | | | | | MgF2 | | |
|---|---|---|---|---|---|---|---|---|---|
| # | Amp | T °C. | NH3 sccm | N2O sccm | Ar sccm | SiH4 sccm | thick μm | thick nm | # cycles | thermal cycling tests results |
| 1 | 100 | 90 | 30 | 30 | 400 | 400 | 16 | 0 | 50 | 100% delamination |
| 2 | 100 | 75 | 30 | 30 | 400 | 400 | 16 | 0 | 50 | 100% delamination |
| 3 | 100 | 55 | 30 | 30 | 400 | 400 | 10 | 0 | 50 | 10% delamination |
| 3 | 100 | 55 | 30 | 30 | 400 | 400 | 10 | 0 | 300 | 50% delamination |
| 4 | 100 | 55 | 30 | 30 | 400 | 400 | 16 | 0 | 50 | 50% delamination |
| 5 | 100 | 90 | 30 | 30 | 400 | 400 | 16 | 20 | 1000 | no delamination |
| 6 | 100 | 75 | 30 | 30 | 400 | 400 | 16 | 14 | 500 | no delamination |
| 7 | 100 | 75 | 30 | 30 | 400 | 400 | 16 | 20 | 500 | 1 hairline crack |
| 8 | 100 | 75 | 30 | 30 | 400 | 400 | 16 | 40 | 500 | no delamination |
| 9 | 100 | 55 | 30 | 30 | 400 | 400 | 16 | 14 | 500 | no delamination |
| 10 | 100 | 55 | 30 | 30 | 400 | 400 | 16 | 20 | 500 | damage around pin* |
| 11 | 100 | 55 | 30 | 30 | 400 | 400 | 16 | 40 | 500 | no delamination |

*tensile pull pin was used to measure adhesion. damage occurred around the stressed removed As shown in Table B, the standard PECVD deposit on Ag/Cr/Al, sample 1, delaminated within the first 50 cycles. Samples 2–4 show the effect of lowering the deposition temperature which has been shown to lower the stress. The failure rate improved slightly at 55° C. and improved slightly more for a thinner deposit but all samples showed some delamination within the first 50 cycles. In comparison, all samples with MgF2 coatings, 5–11, exceeded hundreds of cycles.

Figure 9:
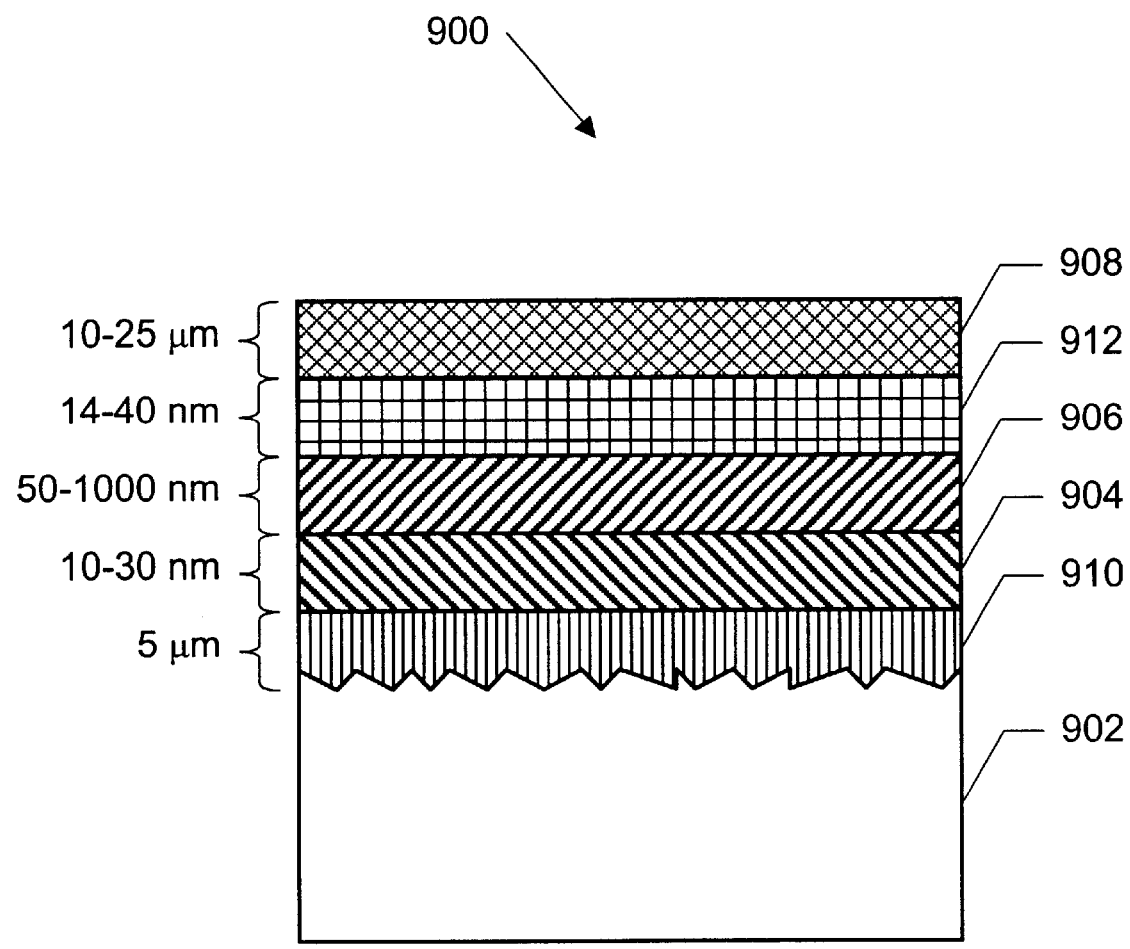
FIG. 9 is an exemplary schematic diagram of an optical solar reflector, according to one embodiment of the present invention.

An embodiment of an optical solar reflector (OSR) 900, according to the present invention, is shown in FIG. 9. OSR 900 comprises a substrate 902, a bond layer 904, a reflective layer 906, a radiative layer 908, a surface-leveling layer 910, and may include a barrier layer 912. Substrate 902 is may be made from a number of materials, such as aluminum, aluminum alloys, such as 6061 aluminum, polyimide, carbon-filled polyimide, or carbon composites. Bond layer 904 provides a bond between substrate 902 and reflective layer 906. Bond layer 904 is typically made a metal or metal alloy, such as chromium, titanium, or titanium tungsten, and is typically approximately 10–30 nanometers (nm) in thickness. Reflective layer 906 is typically made of silver (Ag) or aluminum (Al) and is typically approximately 50–1000 nm in thickness. Radiative layer 908 is typically made from silicon oxide, such as $SiO_2$, silicon nitride, such as $Si_3N_4$, or silicon oxynitride, such as $SiO_xN_y$. Radiative layer 908 may be an individual layer, as shown in FIG. 1, or a modulated layer, as shown in FIG. 3.

Barrier layer 912 is typically made from $MgF_2$, which is typically 14 nm to 40 nm in thickness. Barrier layer 912 improves the adhesion between reflective layer 906 and radiative layer 908 during thermal cycling.

Surface-leveling layer 910 is applied to substrate 902 in order to minimize the surface roughness found on structural aluminum alloys. This inherent surface roughness has a deleterious effect on the α of the resulting OSR. Surface-leveling layer 910 fills in the surface defects of the aluminum substrate and produces a relatively smooth surface for the remaining layers of the OSR.

Preferably, surface-leveling layer 910 is made of a conventional silicone hardcoat (SHC) material, such as that in commercial use. In silicone hardcoat, methyl trimethoxysilane (MTMS) is mixed with aqueous colloidal silica to allow hydrolysis and polycondensation. The massive crosslinking among silane monomers and partially grafted colloidal silica results in extremely hard, glass-like, scratch resistance coatings for transparent plastic substrates.

SHC can be directly applied onto aluminum alloy surface with or without a primer (acrylic resins) by various processes such as flow coating, spray coating and dip coating. The processes are flexible (non-geometry specific, large area) and relatively low cost. In this case, the surface feature of aluminum alloy is initially filled and leveled with liquid SHC and a smooth surface is then formed after curing (crosslinking). A thin layer of silver is then sputtered on the top of the SHC layer to give mirror-like surface followed by PECVD deposition of OSR coating ($SiO_xN_y$).

Because of reduced surface area (i.e., smoother surface), less surface oxide formation occurs during PECVD processes, which minimizes surface absorption and thus improves OSR a performance.

Figure 10:
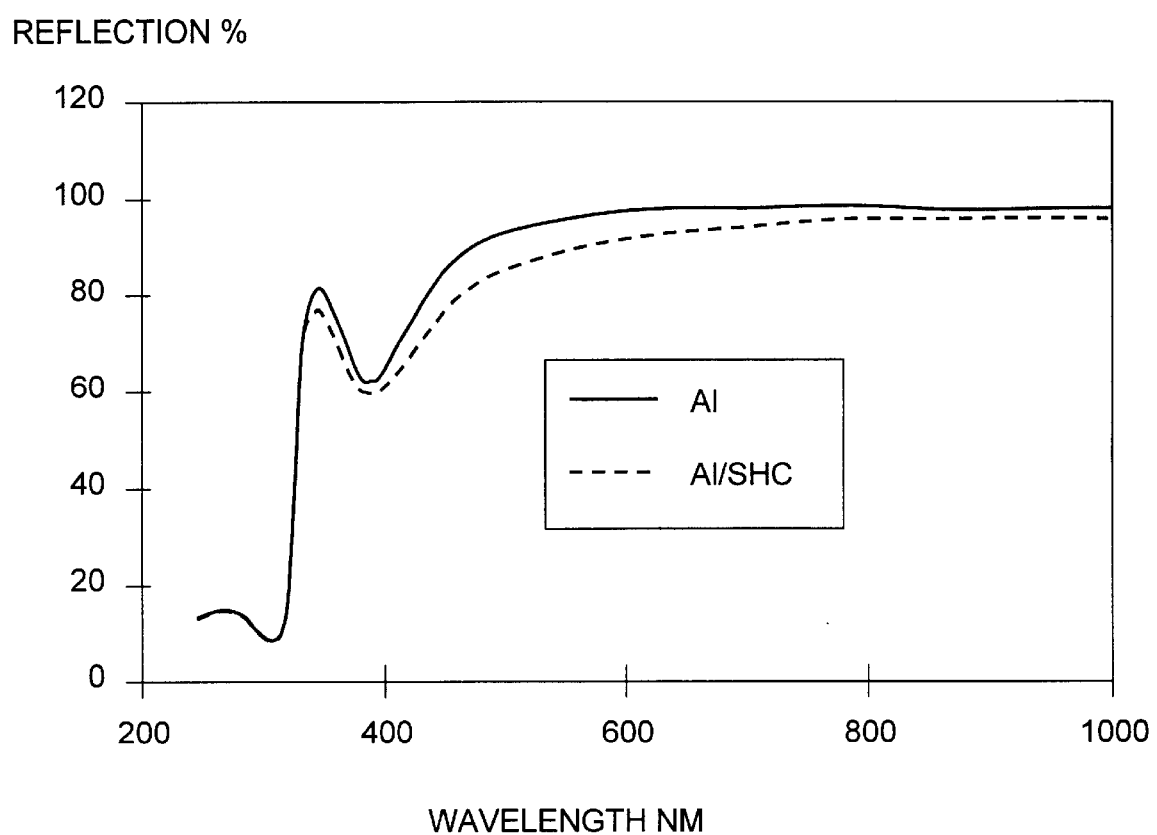
FIG. 10 is an exemplary reflectance spectrum of a typical optical solar reflector, according to the embodiment of the present invention shown in FIG. 9.

SHC coatings were applied to various sizes of aluminum alloy 6061 plates (1"×1" to 6"×6"). In all cases, no primer layers (acrylic resins) were used. The samples were cured at 130 C. for 60 minutes, which gave approximately 1–5 $\mu$m in coating thickness, followed by sputtering of a thin layer of Cr (30 nm)/Ag (300 nm). $SiO_xN_y$ (approximately 17 $\mu$m) was then deposited onto silver surface via PECVD processes as OSR coatings. α performance was measured on these samples and compared to those without underlying SHC coatings. The resulting spectra are shown in FIG. 10. As seen, α value measured for OSR coatings with SHC leveling layer is about 0.076, which is 34% less than that without SHC layer (0.115). This example demonstrates that performance can be significantly improved with the use of underlying silicone hard coat layer.

What is claimed is:
1. An optical solar reflector comprising:
   a substrate of the optical solar reflector;
   a bond layer coating the substrate;
   a reflective layer coating the bond layer; and
   a radiative layer coating the reflective layer, wherein the radiative layer has a thickness of approximately 10 $\mu$m to 25 $\mu$m and an emissivity E of at least approximately 0.7.
2. The optical solar reflector of claim 1, wherein the radiative layer comprises $SiO_2$, $Si_3N_4$, or $SiO_xN_y$.
3. The optical solar reflector of claim 1, wherein the radiative layer has low absorbency of electromagnetic radiation having wavelengths of approximately 200 nm to approximately 2500 nm.
4. The apparatus of claim 1, wherein the the radiative layer comprises $SiO_xN_y$.
5. The apparatus of claim 1, wherein the the radiative layer comprises $SiO_2$ and $Si_3N_4$.
6. The apparatus of claim 1, wherein the the radiative layer comprises $SiO_2$ and $SiO_xN_y$.
7. The optical solar reflector of claim 1, further comprising a barrier layer between the reflective layer and the radiative layer.
8. The optical solar reflector of claim 1, further comprising a surface-leveling layer between the substrate and the bond layer.
9. The optical solar reflector of claim 1, wherein the radiative layer has a modulated refractive index profile.
10. The optical solar reflector of claim 2, wherein the reflective layer comprises aluminum or silver.
11. The optical solar reflector of claim 3, wherein the radiative layer has high absorbency and emissivity electromagnetic radiation having wavelengths of approximately 2.5 $\mu$m to approximately 25 $\mu$m.
12. The optical solar reflector of claim 11, wherein the reflective layer comprises aluminum or silver.
13. The optical solar reflector of claim 11, wherein the radiative layer has a thickness of approximately 16 $\mu$m.
14. The optical solar reflector of claim 12, wherein the bond layer comprises chromium, titanium, or titanium-tungsten.
15. The optical solar reflector of claim 14, wherein the substrate comprises aluminum, aluminum alloy, polyimide, carbon-filled polyimide, or carbon composite.
16. The optical solar reflector of claim 15, wherein the radiative layer is deposited by a plasma enhanced chemical vapor deposition process.
17. The optical solar reflector of claim 15, wherein the reflective layer comprises aluminum or silver and has a thickness of approximately 50 nm to 1000 nm.
18. The optical solar reflector of claim 15, wherein the reflective layer comprises aluminum or silver and has a thickness of approximately 300 nm.
19. The optical solar reflector of claim 17, wherein the bond layer comprises chromium, titanium, or titanium-tungsten and has a thickness of approximately 10 nm to 30 nm.
20. The optical solar reflector of claim 17, wherein the bond layer comprises chromium, titanium, or titanium-tungsten and has a thickness of approximately 20 nm.
21. The optical solar reflector of claim 19, wherein the substrate comprises aluminum, aluminum alloy, polyimide, carbon-filled polyimide, or carbon composite.
22. The optical solar reflector of claim 7, wherein the barrier layer comprises $MgF_2$.
23. The optical solar reflector of claim 22, wherein the barrier layer has a thickness of approximately 14 nm to 40 nm.
24. The optical solar reflector of claim 23, wherein the barrier layer improves adhesion between the reflective layer and the radiative layer during thermal cycling.

25. The optical solar reflector of claim 8, wherein the surface-leveling layer comprises a silicone hardcoat material.

26. The optical solar reflector of claim 25, wherein the surface-leveling layer has a thickness of approximately 5 μm.

27. The optical solar reflector of claim 26, wherein the surface-leveling layer improves surface smoothness of the substrate.

28. The optical solar reflector of claim 9, wherein the modulated refractive index profile of the radiative layer has a plurality of parameters, including peak-to-peak refractive index excursion, period of modulation in optical thickness, and number of modulation cycles.

29. The optical solar reflector of claim 28, wherein the parameters of the modulated refractive index profile of the radiative layer control amplitude, bandwidth and wavelength of rejection bands of the radiative layer.

30. The optical solar reflector of claim 29, wherein the radiative layer comprises $SiO_2$, $Si_3N_4$, or $SiO_xN_y$.

31. The optical solar reflector of claim 30, wherein the radiative layer is deposited by a plasma enhanced chemical vapor deposition process.

32. The optical solar reflector of claim 31, wherein the radiative layer has low absorbency of electromagnetic radiation having wavelengths of approximately 200 nm to approximately 2500 nm and wherein the radiative layer has high absorbency and emissivity electromagnetic radiation having wavelengths of approximately 2.5 μm to approximately 25 μm.

33. The optical solar reflector of claim 32, further comprising a barrier layer between the reflective layer and the radiative layer.

34. The optical solar reflector of claim 33, wherein the barrier layer comprises $MgF_2$.

35. The optical solar reflector of claim 34, wherein the barrier layer has a thickness of approximately 14 nm to 40 nm.

36. The optical solar reflector of claim 35, wherein the barrier layer improves adhesion between the reflective layer and the radiative layer during thermal cycling.

37. The optical solar reflector of claim 36, further comprising a surface-leveling layer between the substrate and the bond layer.

38. The optical solar reflector of claim 37, wherein the surface-leveling layer comprises a silicone hardcoat material.

39. The optical solar reflector of claim 38, wherein the surface-leveling layer has a thickness of approximately 5 μm.

40. The optical solar reflector of claim 39, wherein the surface-leveling layer improves surface smoothness of the substrate.

41. The optical solar reflector of claim 40, wherein the reflective layer comprises aluminum or silver and has a thickness of approximately 50 nm to 1000 nm.

42. The optical solar reflector of claim 41, wherein the reflective layer comprises aluminum or silver and has a thickness of approximately 300 nm.

43. The optical solar reflector of claim 42, wherein the bond layer comprises chromium, titanium, or titanium-tungsten and has a thickness of approximately 10 nm to 30 nm.

44. The optical solar reflector of claim 43, wherein the bond layer comprises chromium, titanium, or titanium-tungsten and has a thickness of approximately 20 nm.

45. The optical solar reflector of claim 44, wherein the substrate comprises aluminum, aluminum alloy, polyimide, carbon-filled polyimide, or carbon composite.

46. A method of producing an optical solar reflector comprising the steps of:
preparing a substrate of the optical solar reflector;
coating the substrate with a bond layer;
coating the bond layer with a reflective layer; and
coating the reflective layer with a radiative layer, wherein the radiative layer has a thickness of approximately 10 μm to 25 μm and an emissivity E of at least approximately 0.7.

47. The method of claim 46, wherein the radiative layer comprises $SiO_2$, $Si_3N_4$, or $SiO_xN_y$.

48. The method of claim 46, wherein the radiative layer has low absorbency of electromagnetic radiation having wavelengths of approximately 200 nm to approximately 2500 nm.

49. The method of claim 46, further comprising the step of coating the reflective layer with a barrier layer.

50. The method of claim 46, further comprising the step of coating the substrate with a surface-leveling layer.

51. The method of claim 46, wherein the radiative layer has a modulated refractive index profile.

52. The method of claim 46, wherein the the radiative layer comprises $SiO_xN_y$.

53. The method of claim 46, wherein the the radiative layer comprises $SiO_2$ and $Si_3N_4$.

54. The method of claim 46, wherein the the radiative layer comprises $SiO_2$ and $SiO_xN_y$.

55. The method of claim 47, wherein the reflective layer comprises aluminum or silver.

56. The method of claim 48, wherein the radiative layer has high absorbency and emissivity electromagnetic radiation having wavelengths of approximately 2.5 μm to approximately 25 μm.

57. The method of claim 56, wherein the reflective layer comprises aluminum or silver.

58. The method of claim 57, wherein the bond layer comprises chromium, titanium, or titanium-tungsten.

59. The method of claim 58, wherein the substrate comprises aluminum, aluminum alloy, polyimide, carbon-filled polyimide, or carbon composite.

60. The method of claim 59, wherein the radiative layer has a thickness of approximately 16 μm.

61. The method of claim 59, wherein the radiative layer is deposited by a plasma enhanced chemical vapor deposition process.

62. The method of claim 59, wherein the reflective layer comprises aluminum or silver and has a thickness of approximately 50 nm to 1000 nm.

63. The method of claim 59, wherein he reflective layer comprises aluminum or silver and has a thickness of approximately 300 nm.

64. The method of claim 62, wherein the bond layer comprises chromium, titanium, or titanium-tungsten and has a thickness of approximately 10 nm to 30 nm.

65. The method of claim 63, wherein the bond layer comprises chromium, titanium, or titanium-tungsten and has a thickness of approximately 20 nm.

66. The method of claim 64, wherein the substrate comprises aluminum, aluminum alloy, polyimide, carbon-filled polyimide, or carbon composite.

67. The method of claim 49, wherein the barrier layer comprises $MgF_2$.

68. The method of claim 67, wherein the barrier layer has a thickness of approximately 14 nm to 40 nm.

69. The method of claim 68, wherein the barrier layer improves adhesion between the reflective layer and the radiative layer during thermal cycling.

70. The method of claim 50, wherein the surface-leveling layer comprises a silicone hardcoat material.

71. The method of claim 70, wherein the surface-leveling layer has a thickness of approximately 5 μm.

72. The method of claim 70, wherein the surface-leveling layer improves surface smoothness of the substrate.

73. The method of claim 51, wherein the modulated refractive index profile of the radiative layer has a plurality of parameters, including peak-to-peak refractive index excursion, period of modulation in optical thickness, and number of modulation cycles.

74. The method of claim 73, wherein the parameters of the modulated refractive index profile of the radiative layer control amplitude, bandwidth and wavelength of rejection bands of the radiative layer.

75. The method of claim 74, wherein the radiative layer comprises $SiO_2$, $Si_3N_4$, or $SiO_xN_y$.

76. The method of claim 75, wherein the radiative layer is deposited by a plasma enhanced chemical vapor deposition process.

77. The method of claim 76, wherein the radiative layer has low absorbency of electromagnetic radiation having wavelengths of approximately 200 nm to approximately 2500 nm and wherein the radiative layer has high absorbency and emissivity electromagnetic radiation having wavelengths of approximately 2.5 μm to approximately 25 μm.

78. The method of claim 77, further comprising the step of coating the reflective layer with a barrier layer.

79. The method of claim 78, wherein the barrier layer comprises $MgF_2$.

80. The method of claim 79, wherein the barrier layer has a thickness of approximately 14 nm to 40 nm.

81. The method of claim 80, wherein the barrier layer improves adhesion between the reflective layer and the radiative layer during thermal cycling.

82. The method of claim 81, further comprising the step of coating the substrate with a surface-leveling layer.

83. The method of claim 82, wherein the surface-leveling layer comprises a silicone hardcoat material.

84. The method of claim 83, wherein the surface-leveling layer has a thickness of approximately 5 μm.

85. The method of claim 84, wherein the surface-leveling layer, improves surface smoothness of the substrate.

86. The method of claim 85, wherein the reflective layer comprises aluminum or silver and has a thickness of approximately 50 nm to 1000 nm.

87. The method of claim 85, wherein the reflective layer comprises aluminum or silver and has a thickness of approximately 300 nm.

88. The method of claim 86, wherein the bond layer comprises chromium, titanium, or titanium-tungsten and has a thickness of approximately 10 nm to 30 nm.

89. The method of claim 88, wherein the bond layer comprises chromium, titanium, or titanium-tungsten and has a thickness of approximately 20 nm.

90. The method of claim 89, wherein the substrate comprises aluminum, aluminum alloy, polyimide, carbon-filled polyimide, or carbon composite.

* * * * *

UNITED STATES PATENT AND TRADEMARK OFFICE
CERTIFICATE OF CORRECTION

PATENT NO. : 6, 587,263 B1 Page 1 of 1
DATED : July 1, 2003
INVENTOR(S) : Charles D. Iacovangelo et al.

It is certified that error appears in the above-identified patent and that said Letters Patent is hereby corrected as shown below:

<u>Title page,</u>
Item [57], ABSTRACT,
Lines 7-8, "low absorbency" should read -- has low absorbency --.

<u>Column 13,</u>
Line 5, "method of claim 70," should read -- method of claim 71, --.

Signed and Sealed this

Fourteenth Day of September, 2004

JON W. DUDAS
*Director of the United States Patent and Trademark Office*